United States Patent [19]

Easterling et al.

[11] 4,278,978
[45] Jul. 14, 1981

[54] BASEBAND SIGNAL COMBINER FOR LARGE APERTURE ANTENNA ARRAY

[76] Inventors: Robert A. Frosch, Administrator of the National Aeronautics and Space Administration, with respect to an invention of Mahlon E. Easterling, Altadena; Robin A. Winkelstein, La Crescenta, both of Calif.

[21] Appl. No.: 76,643

[22] Filed: Sep. 18, 1979

[51] Int. Cl.³ .............................................. H04B 7/00
[52] U.S. Cl. .............................. 343/100 CL; 455/278
[58] Field of Search .................. 343/100 CL, 100 LE; 455/139, 278

[56] References Cited

U.S. PATENT DOCUMENTS

4,005,426  1/1977  Wite .............................. 343/100 CL

Primary Examiner—Theodore M. Blum
Attorney, Agent, or Firm—Monte F. Mott; John R. Manning; Paul F. McCaul

[57] ABSTRACT

A method and apparatus for combining baseband signals from a large aperture antenna array in which none of the individual baseband signals has a sufficiently high signal-to-noise ratio to be used as a correlation or reference signal for phase adjusting the remaining baseband signals. More specifically, the invention provides a means whereby the baseband output signals of all but one of the receivers associated with each of the antennas are summed and used as a correlation reference for the baseband signal not contained in the summed signal, thereby providing a plurality of correlation or alignment loops, each having an output signal related to the phase difference between its input baseband signal and the summed signal. The invention further provides a means for subtracting an output or error signal generated in one of the correlation loops whose baseband signal has a predetermined phase delay from all the other alignment loops, thereby avoiding interaction and reflection effects in the signal combiner. A variable phase delay means for each of the other baseband signals is controlled by its corresponding correlation loop. The invention discloses how a plurality of loops operating in the above manner provides a means for adjusting the phase of each baseband signal so that they will all be in phase with each other and can thus be added to provide a composite signal output having a higher signal-to-noise ratio than any of the individual baseband signals.

17 Claims, 5 Drawing Figures

BASEBAND SIGNAL COMBINER FOR LARGE APERTURE ANTENNA ARRAY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The invention relates to the field of large antenna/receiver arrays in which output signals of the individual receivers are to be phase adjusted so that they can be coherently added, thereby producing an output signal having a greatly improved signal-to-noise ratio over that of any of the individual receiver output signals.

The concept of phase adjusting signals derived from a plurality of antenna/receiver arrays so that the signals can be coherently added is not new. One such system is described in an article entitled "Analysis of the Signal Combiner for Multiple Antenna Arraying" by R. A. Winkelstein, JPL Deep Space Network Progress Report 42-26, Pages 102-118, dated Apr. 15, 1975. However, in order for this system to perform properly, one of the receiver outputs or baseband signals must have a sufficiently high signal-to-noise ratio to serve as a reference for correlation with the other baseband signals so that their phases can be adjusted accordingly. If all receiver baseband signal-to-noise ratios are below a certain minimum level, then individual loop correlations for phase adjusting the baseband signals take an excessive amount of time, thereby seriously degrading alignment accuracy. Thus, conventional signal combiners are unable to satisfactorily provide a composite signal when there is a lack of a single strong signal to act as a phase reference for the remaining signal control loops. The present invention solves this problem by providing a means whereby all of the signals can be phase-correlated with one of the selected signals even though none of the individual signals has a sufficiently high signal-to-noise ratio to act as a reference for the control loops of the remaining signals. It has been found that in a typical system using a plurality of loop correlators to phase adjust the individual signals, one of the signals should have a signal-to-noise ratio greater than 0 dB. However, a system according to the present invention utilizing a 10 antenna array has been shown to operate with individual baseband signal-to-noise ratios as low as −7.7 dB.

SUMMARY OF THE INVENTION

As explained above, conventional signal combiners provide to the correlator a reference signal having a sufficiently high signal-to-noise ratio for correlation purposes. If no single signal meets this critera, then a reference signal which is a coherent sum of the individual signals would have a sufficient signal-to-noise ratio to act as a reference. However, use of such a reference in a conventional signal combiner would cause highly interactive loop operation and would have a large tendency towards loop instability. The present invention provides a means for eliminating this instability by utilizing a signal combiner which uses combined receiver outputs as a reference for the loop correlators, but at the same time provides a means for allowing decoupled stable operation for the individual alignment loops.

The invention provides a means for delaying a first baseband signal by a predetermined amount, and then for each of the remaining baseband signals to be electronically delayed in time by a sampled data feedback loop in order to match in time the delayed first baseband signal. Each of the remaining baseband signals, after passing through an associated variable delay means, is provided to a corresponding correlator which generates a digital signal related to the phase difference between that signal and a combined signal provided to the correlator comprising a sum of all of the other delayed baseband signals. However, instead of utilizing the output of the correlator to adjust its associated variable delay means, it is first provided to a difference unit. A correlation signal derived from a phase comparison of the first baseband signal, after having been delayed by the predetermined amount, and the sum of the remaining baseband signals is also provided to the difference unit. The difference unit provides an output signal related to the difference of its two correlation signal inputs, this output being used to control its associated variable delay means. By controlling the variable delay means for the baseband signals in the above-described manner, interaction and reflection effects because of the moving baseband signals presented to the correlators are eliminated, and each of the baseband signals will be delayed so as to be in phase with the first baseband signal. This coincidence of phases results because a correlation signal derived from the first baseband signal, which has been delayed by a fixed time increment, and the sum signal of all the remaining delayed baseband signals is subtracted from each of the other correlation signals, thereby cancelling the signal terms in each of the other loops other than that corresponding to the signal to be corrected. This occurs because the first correlation signal contains all of the sum signal components and each of the other correlation signals also contain all of the sum signal components with the exception of the specific signal to be corrected. Therefore, after subtraction of the first correlation signal from each of the other correlation signals, only errors associated with the specific baseband signal to be corrected are applied to its associated variable delay means, thereby providing the means whereby each delayed baseband signal can be brought into phase coincidence with all of the other baseband signals.

DETAILED DESCRIPTION

A detailed illustrative embodiment of the invention is disclosed herein which exemplifies the invention and is currently considered to be the best embodiment for such purposes. However, it is to be recognized that other means for determining delays between two input signals whose phases are to be compared, and other means for delaying an input signal could be utilized. Accordingly, the specific embodiment disclosed is only representative in providing a basis for the claims which define the scope of the present invention.

Figure 1:
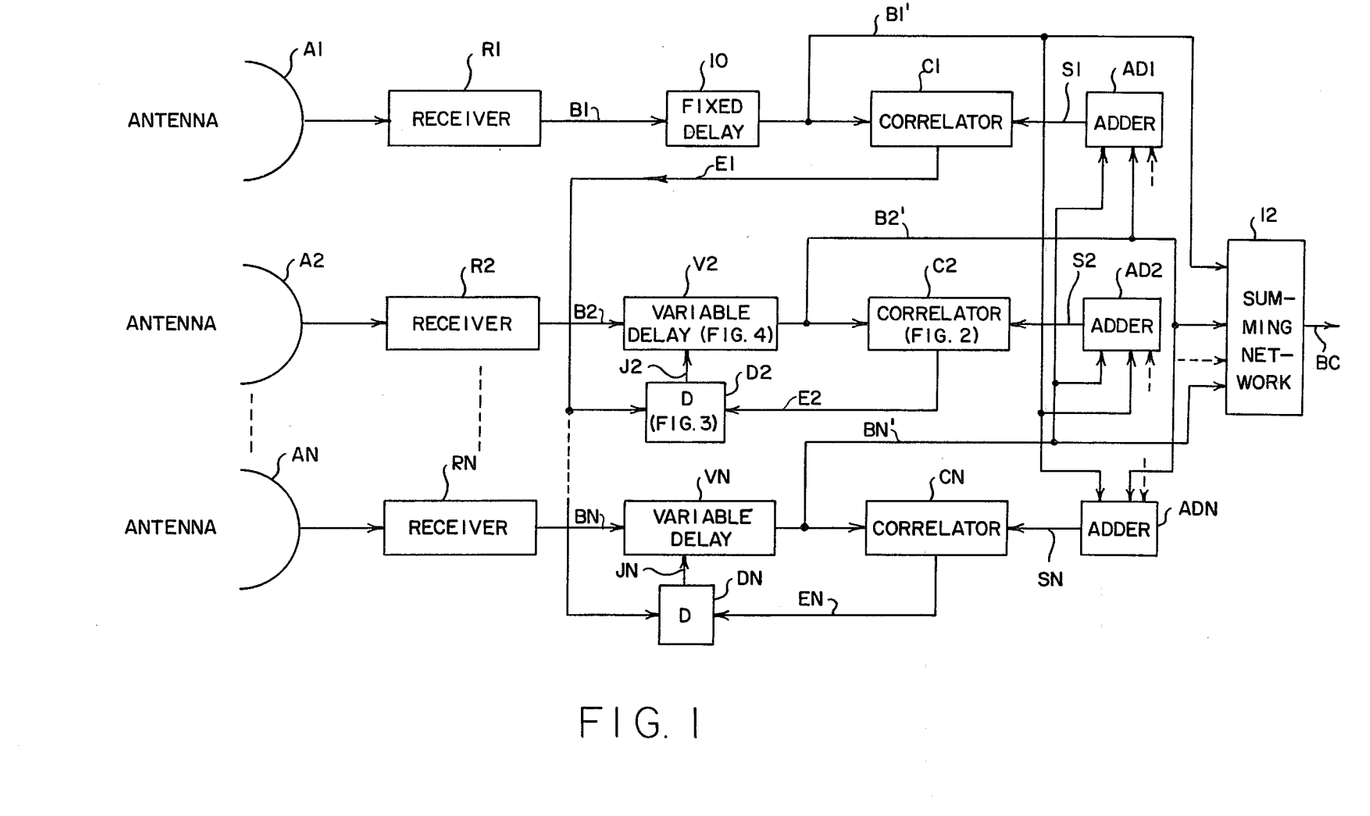
FIG. 1 is a block diagram of the baseband signal combiner provided by the invention.

Referring to FIG. 1, a plurality of antennas, A1 thru AN, where N is 3 or more, are connected to corresponding receivers R1 through RN. The antennas A1 thru AN are looking essentially at the same radiating source and are providing output signals which are roughly equal in magnitude and have low signal-to-noise ratios, i.e., less than 0 dB. Each receiver R1 thru RN processes the RF information from its associated antenna, and provides an information-containing baseband signal output B1 thru BN which could be in either analog or digital form. Processing of the first baseband signal B1 will be described separately since it is somewhat different than that of the remaining baseband signals B2 thru BN. The first baseband signal B1 is delayed by a fixed delay circuit 10, a delay being required since other baseband signals may actually precede the first baseband signal B1 in phase. The output of the fixed delay circuit 10 is designated as B1' and establishes a phase reference to which the remaining baseband signals B2 thru BN are to be adjusted. A first correlator C1 is provided, the correlator C1 having as one input the first delayed baseband signal B1' and as another input a sum signal S1 from a first adder AD1, this signal being a sum of all other baseband signals B2–BN after having been delayed as will be explained below. The first correlator C1 compares the phase of the first delayed baseband signal B1' and the sum signal S1 from the first adder AD1, and provides a first correlation signal E1 which is related to the phase difference between the delayed first baseband signal B1' and the sum signal S1. This correlation signal E1 identifies both the phase difference between the two signals and which is the leading signal.

Referring now to the second antenna A2 and receiver R2 combination, a second baseband signal B2 is provided, this signal most probably having a phase difference with respect to the first baseband signal B1 due to a difference in pointing between the second antenna A2 and the first antenna A1, and a difference in lag introduced by their respective antenna and receiver systems. The second baseband signal B2 is provided to a first variable delay circuit V2, to be described in more detail below. The output of the variable delay circuit V2 defines a second delayed baseband signal B2' which is provided to a second correlator C2. A second adder AD2 receives as inputs all of the other delayed baseband signals, B1' and B3' thru BN', except that of B2', and provides second sum signal S2 to the second correlator C2. As explained for the first correlator C1, the second correlator C2 compares the phase of the second delayed baseband signal B2' and the phase of the second sum signal S2, and provides a second correlation signal E2 related to the phase difference between its two input signals B2' and S2. This correlation signal E2 is then provided to a difference unit D2, the function of which is to provide a variable delay signal J2 related to the difference between the first correlation signal E1 and the second correlation signal E2. This variable delay signal J2 then controls the variable delay circuit V2 so that the phase of the second delayed baseband signal B2' will coincide with the phase of the second sum signal S2, that signal being the sum of all of the other delayed baseband signals B1', B3' thru BN'. Thus, a correlation loop defined by the variable delay circuit V2, the second correlator C2, and the second difference unit D2 will tend to delay the second delayed baseband signal B2' so that it will be in phase with the second sum signal S2. However, the second difference unit D2 provides a means whereby the variable delay signal is also related to the first correlation signal E1, which is related to the phase difference between the first delayed baseband signal B1' and all of the other delayed baseband signals B2 thru BN, as previously explained.

Baseband signals B3 thru BN from the remaining receivers R3 thru RN are processed in the same way as the second baseband signal B2. All of the delayed baseband signals B1' thru BN' are provided to a summing network 12, the output of which provides a composite baseband signal BC. The signal combiner as above described provides stable correlation loops which result in all of the delayed baseband signals B1' thru BN' being in phase, and provides a composite baseband signal BC from the summing network 12 which has a signal-to-noise ratio significantly higher than that of the individual baseband signals.

In operation, and again referring to FIG. 1, the outputs of the receivers R1 thru RN define baseband signals B1 thru BN, respectively, which are to be phase aligned with respect to each other. Each of the receivers R2 thru RN provide input baseband signals B2 thru BN to individual control loops which provide delayed baseband output signals B2' thru BN' aligned to the first baseband signal which has been delayed by a predetermined time increment. Use of the first correlator C1, associated with the first delayed baseband signal B1', causes the delay of a first sum signal S1 to become equal to the delay provided by the fixed delay circuit 10, whereby resulting in all the remaining baseband signals B2' thru BN' to be aligned with the first delayed baseband signal B1'. Subtracting the output E1 of the first correlator C1 from each of the other correlator outputs E2 thru EN causes each of the correlation loops to become decoupled from the other loops, thus providing stable operation. Each correlation signal $E_i$, is given by the equation $$E_i = K \sum_{k=1}^{N} (\tau_i - \tau_k) \qquad (1)$$
$$= NK\tau_i - K \sum_{k=1}^{N} \tau_k$$

where i reaches to any of the correlation signals, K is the correlator constant, N is the number of antennas in the array and $\tau_i$ is the time delay of the baseband signal into the ith correlator. Thus, the output E1 of the first correlator C1 is $$E_1 = K \sum_{k=1}^{N} (\tau_1 - \tau_k) \qquad (2)$$
$$= NK\tau_1 - K \sum_{k=1}^{N} \tau_k$$

subtracting Equation (2) from Equation (1) gives $$E_i - E_1 = NK(\tau_1 - \tau_1) \qquad (3)$$

Since $\tau_1$, associated with the fixed delay circuit 10, is fixed, it may be used as a zero time references. Thus, the variable delay signal J2 to each of the variable delay circuits $V_2$ is $$J_i = NK\tau_i \text{ where } i = 2, 3, \ldots N \quad (4)$$

where $\tau_i$ is now the relative delay of each delayed baseband signal with respect to the first delayed baseband signal B1'.

These equations hold only if the delayed baseband signals are aligned within one quarter of a subcarrier cycle. For acquisition, this can be easily accomplished by roughly presetting the variable delay circuits V2 thru VN using knowledge of antenna pointing coordinates.

Figure 2:
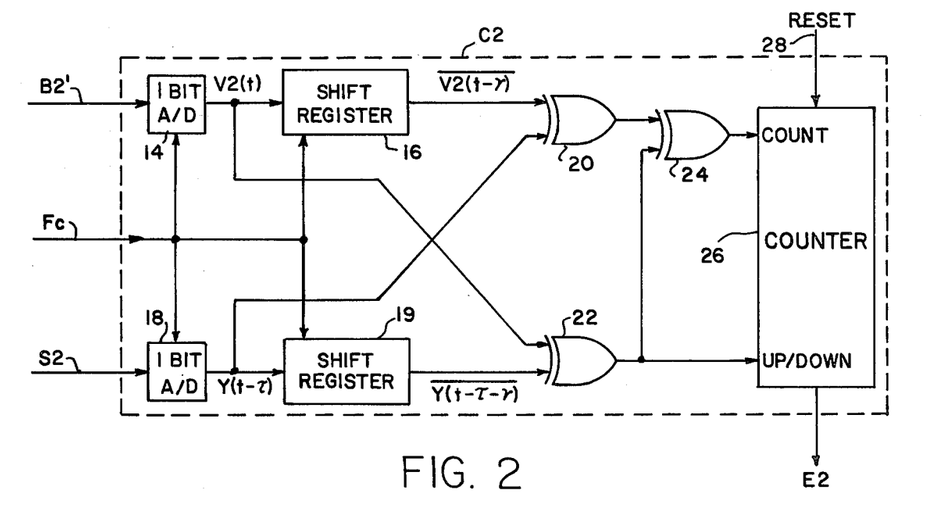
FIG. 2 is a block diagram of one of the correlators shown in FIG. 1.

Each of the correlators C1 through CN are identically configured, the second correlator C2 being shown for exemplary purposes in FIG. 2. As can be seen, the second delayed baseband signal B2' is provided to a first one bit analog-to-digital converter 14, the output of which comprises a bit stream having a bit rate equal to a clock pulse sample frequency $F_c$, and each bit having a state corresponding to the polarity or state of the second delayed baseband signal B2' when sampled. The output of the first analog-to-digital converter 14 is designated as V2(t). This signal is provided to a first shift register 16, which is also clocked at the clock pulse sample frequency $F_c$. The output of the first shift register 16 is a signal corresponding to V2(t) going into the shift register, but delayed by a delay period $\gamma$, $\gamma$ being defined as the delay in V2(t) created by the number of clock pulses at the sample frequency $F_c$ required to shift V2(t) through the first shift register 16. In a similar manner, the sum signal S2 from the second adder AD2, which comprises the sum of all of the delayed baseband signals B1' thru BN', except B2' is provided to a second one bit analog-to-digital converter 18. This signal S2 is processed by the second analog-to-digital converter 18 in the same way as the second delayed baseband signal B2' is processed by the first analog-to-digital converter 14. The output of the second analog-to-digital converter 18 is designated as $Y(t-\tau)$ where $\tau$ is the phase difference between B2' and S2. This signal $Y(t-\tau)$ is clocked through a second shift register 19 and is delayed by a time increment $\gamma$, its output being designated as $Y(t-\tau-\gamma)$. A first exclusive-OR circuit 20 receives $\overline{V2(t-\gamma)}$ and $Y(t-\tau)$ as inputs. A second exclusive-OR circuit 22 is also provided, this circuit receiving as inputs V2(t) and $\overline{Y(t-\tau-\gamma)}$. The output of both the first and second exclusive-OR gates 20 and 22, respectively, are provided to a third exclusive-OR gate 24, the output of which is indicative of whether signals B2' and S2 are in phase. If they are not in phase, a counter 26 is indexed by the third exclusive-OR gate 24. The output of the second exclusive-OR gate 22 defines whether the counter 26 counts up or down. The output E2 from the counter 26 thus provides an indication of the magnitude of phase difference between B2' and S2 as well as which of the two signals is leading in phase with respect to the other. The counter 26 is reset at periodic intervals by a reset pulse or reset line 28, so that the second correlation signal E2 is redefined at predetermined time intervals. The correlator C2 thus provides a count at predetermined intervals defined by a pulse on the reset line 28 which is related to the phase difference between B2' and S2. It will produce a count of zero when the input signals are exactly in phase or aligned. When the input signals are not aligned, the count is related to the phase delay. In effect, the second correlator output E2 represents an integral of the input signal phase difference averaged over a time interval defined by the reset pulse on line 28. Thus, operation of the correlator is equivalent to that of an integrate and dump circuit having a predetermined gain constant.

Figure 3:
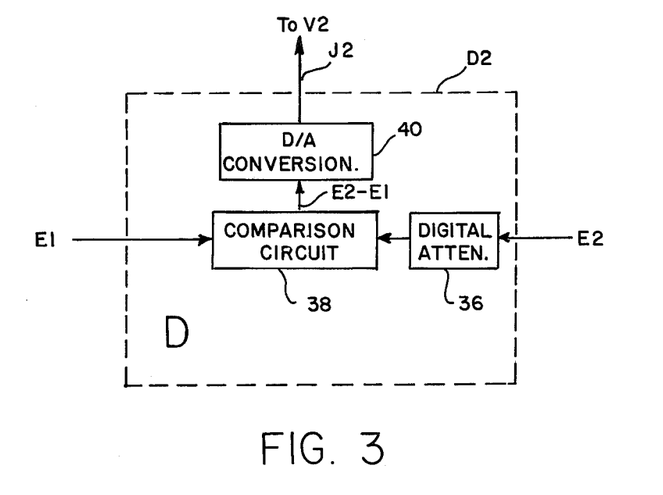
FIG. 3 is a block diagram of one of the difference units shown in FIG. 1.

The difference units D2-DN are also identical in configuration. A typical difference unit D2 is shown in FIG. 3. The output E2 of the second correlator C2 is provided to a digital attenuator 36 for appropriate scaling in accordance with a predetermined gain constant. A comparison circuit 38 is provided for subtracting the first correlation signal E1 from the second correlation signal E2, thereby supplying an output signal directly related to the phase error of the second delayed baseband signal B2'. If both of the inputs to the comparison circuit 38 correspond to zero count, then its output would be zero, thereby indicating that the second delayed baseband signal B2' is in phase with the first delayed baseband signal B1'. The output of the comparison circuit 38 is converted to an analog signal J2 by a digital-to-analog converter 40, this delay control signal J2 controlling the amount of delay to be introduced by the second variable delay circuit V2. The delay control signal J2 could also be a digital signal and the type of variable delay circuit V2 chosen accordingly.

The comparison circuit 38 provides a means whereby a correlation signal E1 derived from the fixed delay circuit 10 and its associated sum signal is subtracted from the second correlation signal E2. This allows the signal terms from all of the other correlation loops to cancel out in the second correlation loop because the first correlation signal E1 is related to the sum of the other delayed baseband signals B2' thru BN' and the second correlation signal E2 is related to all of these sum signal components. Therefore, subtraction of the first correlation signal E1 from the second correlation signal E2 results in only the error related to the second delayed baseband signal B2' being applied to the variable delay circuit V2. The other correlation loops operate in the same manner.

Figure 4:
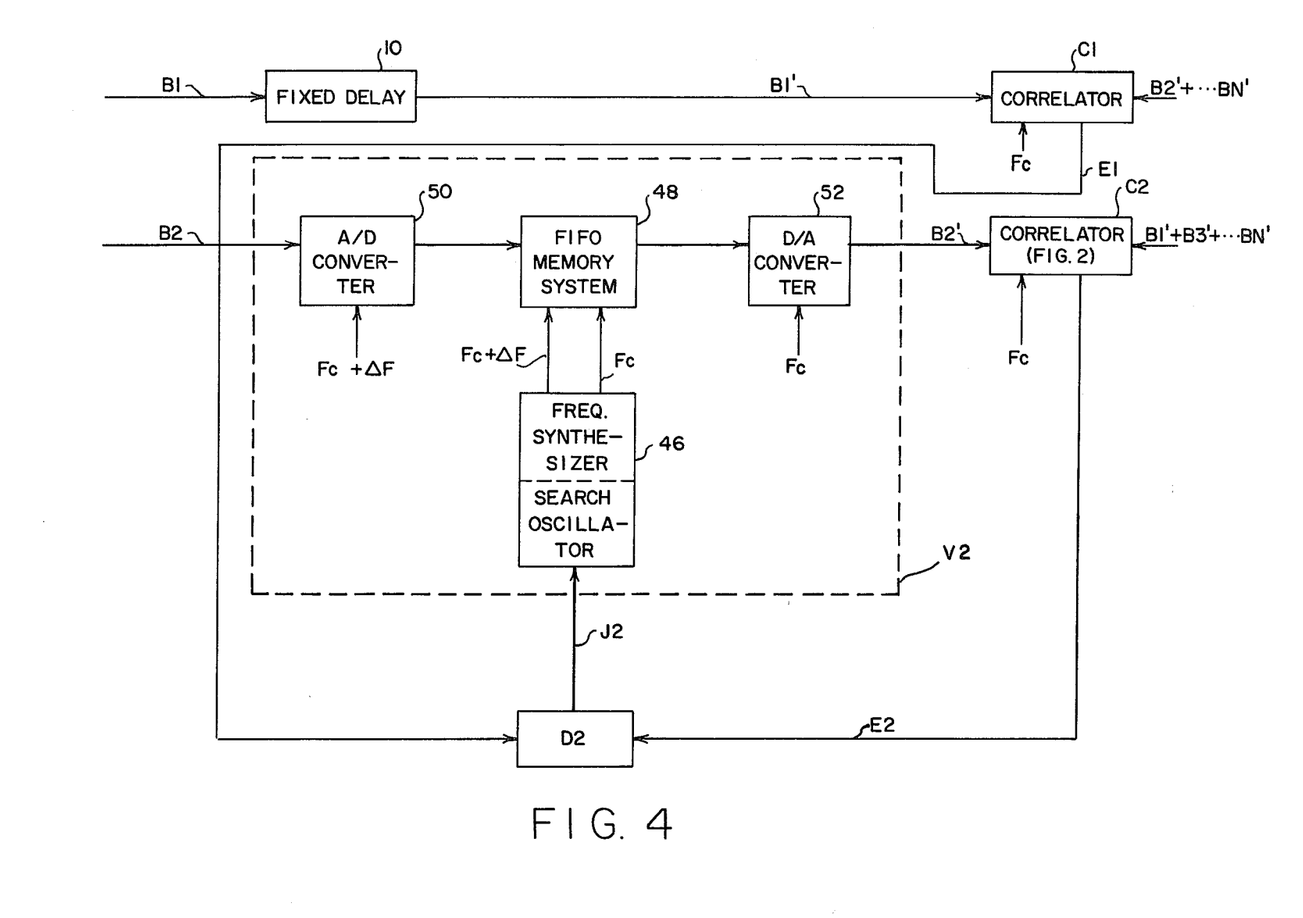
FIG. 4 is a block diagram of one of the variable delay circuits shown in FIG. 1.

The variable delay circuits V2 thru VN are also identical in configuration, the one associated with the second baseband signal being shown in FIG. 4 for illustrative purposes. As can be seen, the delay control signal J2 from the second difference unit D2 is provided to a frequency synthesizer and search oscillator 46 which provides two clock pulse outputs. The first clock pulse output $F_c$ is the clock pulse sample frequency previously discussed. The second clock pulse output is $F_c + \Delta F$, $\Delta F$ being controlled by the delay control signal J2. A first in, first out (FIFO) memory system 48 is also provided, the memory system 48 being responsive to the second clock signals $F_c + \Delta F$ for clocking bytes into memory, and responsive to $F_c$ for clocking bytes out of memory. A delayed baseband signal analog-to digital converter 50 provides digital bytes defining the second baseband signal B2, the bytes being provided at a frequency $F_c + \Delta F$. A delayed baseband signal digital-to-analog converter 52 converts output digital bytes from the memory system 48 to an analog delayed baseband signal B2' at a frequency defined by the first clock pulse output frequency $F_c$. Thus, the time interval required for a specific byte to pass through the FIFO memory system 48 is related to $\Delta F$, which in turn is controlled by the delay control signal J2.

Figure 5:
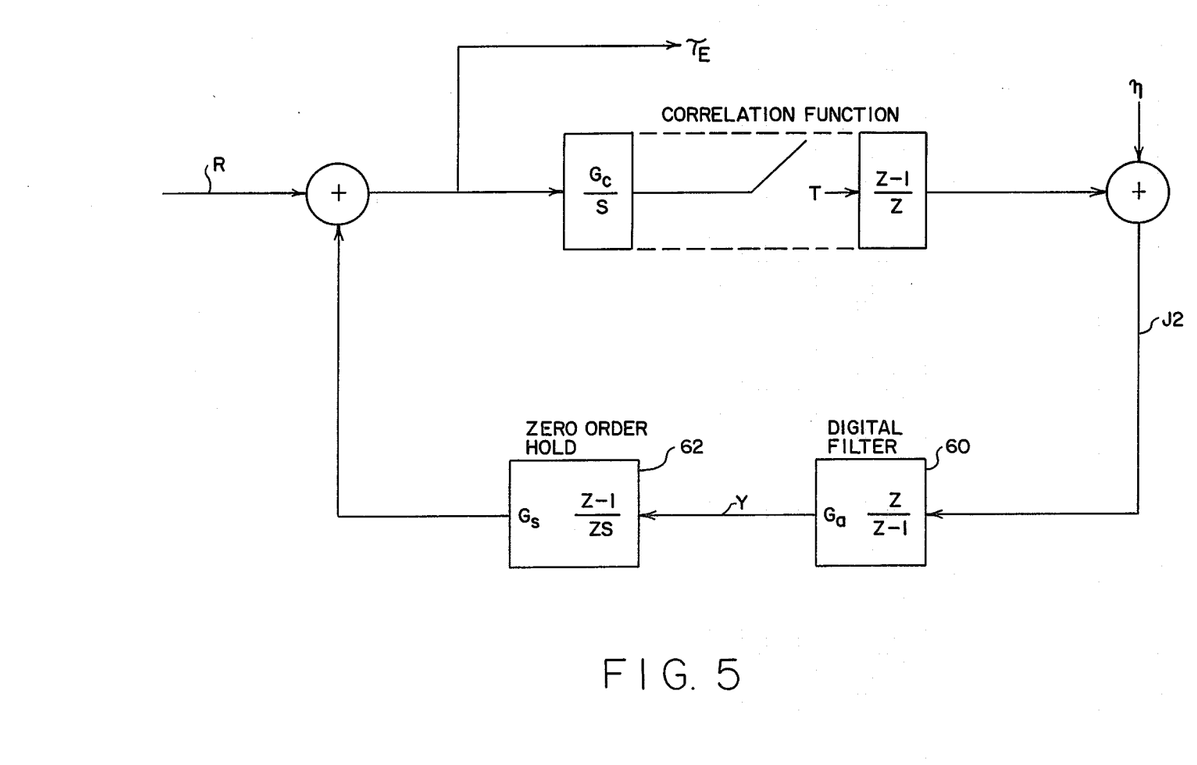
FIG. 5 is a Laplace block diagram for a typical correlator/variable delay loop.

An analysis for one of the correlator loops will now be described. It should be understood that this analysis is equally applicable to any of the correlator loops associated with the baseband signals B2 thru BN. A Laplace diagram for a correlation loop is shown in FIG. 5. In FIG. 5, s is the Laplace complex frequency, Z is exp(sT), T is the correlation period between correlator outputs as defined by the reset pulse on the reset line 28, G's are the gain constants for the loop components, R is the input signal delay of the second baseband signal B2, $\tau_E$ is the time delay of the loop output signal B2', and $\eta$ is the noise portion of the correlation signal J2. The delay control signal J2 is the difference between the first and second correlation signals, E1 and E2, respectively. The noise $\eta$ results from large noise components in the input signals.

The delay control signal J2 updates the variable delay circuit V2 according to the difference equation $$Y_{n+1} = Y_n + G_a V_{n+1} \tag{5}$$

where $Y_n$ is the previous time delay. Taking the z-transform of the preceding equation (5) provides the digital filter function indicated at 60. The zero order hold function indicated at 62 is created between the variable delay value is held constant throughout the correlation period T.

This control loop is a first order loop which means that the output error is driven to zero for a step input delay function. For a ramp input delay, the loop has a steady state error $\tau_\infty$ given by $$\tau_\infty = [R_a T(2-G)]/2G \tag{6}$$

where $R_a$ is the input ramp in microseconds/second, $\tau_\infty$ is the steady state error in microseconds, and G is the open loop gain loop constant given by T times the product of the individual loop component gain constants.

Of major importance to a degradation specification is the standard deviation of the loop output loop $\sigma_E$, caused by the correlator output noise $\eta$ This is found to be $$\sigma_E = \frac{\sigma_n}{TG_c} \sqrt{\frac{G}{2-G}} \tag{7}$$

where $\sigma_n$ is the standard deviation of the correlator output noise $\eta$. From stochastic analysis of the correlation function, $$\sigma_n = \sqrt{\frac{2NT_s}{\pi kT}} \tag{8}$$

$$G_c = [2R_T(4T_D - T_s)]/\pi T_D^2 k$$

where $2kf_s$ is the noise bandwidth of a low pass filter in the receiver, $f_s$ is the frequency of the baseband signal and $f_s = 1/T_s$, $f_D$ is the data rate in symbols per second and $f_D = 1/T_D$, N is the number of antennas in the array, $R_T$ is the signal-to-noise ratio of the signal S2 at the output of the second adder AD2. These equations are based on hard limiting of the individual signals before being supplied to the correlator. The sum of the signals to the correlator reference input, that is the sum of the signals provided by the output of the second adder AD2, is the algebraic sum of the hard limited signals. Of course, the output sum of signals from the summing network 12 is the sum of the full value individual signals before being hard limited.

Although each of the sum signals S1-SN has been described as not containing the delayed baseband signal to which it is to be correlated, each sum signal could include all the delayed baseband signal B1'-BN' without significantly affecting the correlation process.

Thus, from the above, it should be apparent that a method and means has been disclosed for summing baseband output signals from a plurality of receiving systems for large aperture antenna simulation wherein the sum of certain of the outputs of the receivers are used as correlation references. The various loops become stable because a means for cancelling out interactive signals from other loops is also provided.

We claim:

1. A baseband signal combiner for an antenna array comprising a plurality of antennas each having an associated receiver, each of said receivers providing a baseband output signal to be combined with other receiver baseband output signals, comprising:

means for phase comparing a first baseband signal and a first sum signal comprising all the other baseband signals, thereby generating a first correlation signal related to the phase difference between said first baseband signal and said first sum signal;

means for phase comparing each of the other baseband signals and a signal that is the sum of all the baseband signals except the baseband signal being compared, each phase comparison generating a correlation signal related to the phase difference between the baseband signal and the sum signal being compared;

means for subtracting the phase difference represented by said first correlation signal from each of said other correlation signals, thereby generating a variable delay signal corresponding to each of the other baseband signals; and means for adjusting the phase of each of said other baseband signals in accordance with its associated variable delay signal, thereby resulting in all of said baseband signals being in phase with each other.

2. The baseband signal combiner of claim 1 wherein said sum signal comprising all the baseband signals except the baseband signal being compared further comprises the baseband signal being compared.

3. A baseband signal combiner for a large aperture antenna array having a plurality of baseband signal outputs whose phases are to be matched, comprising:

first delay means for delaying a first baseband signal by a predetermined time increment;

variable delay means for delaying each of said remaining baseband signals;

means for providing a plurality of sum signals each of which comprises a sum of all but one said delayed baseband signals;

means for generating a plurality of correlation signals each of which is related to a phase difference between one of said plurality of baseband signals having been delayed by its corresponding delay means and said sum signal comprising all of said delayed baseband signals except said baseband signal whose phase difference is to be measured;

means for developing a plurality of delay control signals related to said correlation signal derived from said first baseband signal, and each of said remaining correlation signals;

means for controlling said variable delay means for each of said remaining baseband signals by its corresponding delay control signal whereby all of said remaining baseband signals will be in phase with said first baseband signal; and means for summing all of said delayed baseband signals thereby providing a composite baseband output signal.

4. The baseband signal combiner of claim 3 wherein said variable delay means comprises a plurality of variable delay units, each of which corresponds to one of said remaining baseband signals, each unit comprising:
a first in, first out (FIFO) memory means;
means for converting a baseband signal into input digital bytes defining the amplitude of said baseband signal, said converting to be accomplished at a first predetermined clock frequency;
means for clocking each of said input digital bytes into said FIFO memory system at said first predetermined clock frequency; and
means for clocking each of said input digital bytes out of said FIFO memory system at a second predetermined clock frequency, differences between said first and second predetermined clock frequencies defining a delay between said input digital byte and its corresponding output digital byte.

5. The baseband signal combiner of claim 4 wherein each of said variable delay units further comprises means for converting said output digital bytes into an analog signal, said analog signal defining a delayed baseband signal.

6. The baseband signal combiner of claim 4 wherein said means for controlling said delay means comprises a plurality of frequency synthesizers, one of which corresponds to each of said variable delay units, each of said frequency synthesizers providing a first clock signal defining said first predetermined clock frequency and a second clock signal defining said second predetermined clock frequency, said first clock signal frequency being determined by its corresponding delay control signal.

7. The baseband signal combiner of claim 3 wherein said means for generating a plurality of correlation signals comprises a plurality of correlators, one of which corresponds to each baseband signal, each correlator comprising:
first means for sampling its input delayed baseband signal at a predetermined sampling rate and providing a bit at each sample time indicating the polarity of said delayed baseband signal;
second means for sampling its input sum signal at said predetermined sampling rate and providing a bit at each sample time indicating to polarity of said input sum signal; and
means for comparing corresponding input delayed baseband and input sum signal polarity bits and providing an output signal at predetermined time intervals which defines the number of times corresponding polarity bits were not in phase and the lead or lag phase relationship between said input delayed baseband signal and said input sum signal, said output signal comprising one of said correlation signals.

8. The baseband signal combiner of claim 7 wherein said means for developing a plurality of delay control signals comprises a plurality of difference units each of which comprises:
means for developing a digital signal defining the difference between said correlation signal corresponding to said first baseband signal and the correlation signal corresponding to one of said remaining baseband signals; and
means for converting said developed digital signal into an analog signal, said analog signal comprising one of said delay control signals.

9. The baseband signal combiner of claim 8 wherein each of said plurality of sum signals comprises a sum of all of said delayed baseband signals.

10. In combination with a plurality of antennas and associated receivers, each of which provides a baseband signal having an unknown phase relationship to the other baseband signals, a means for adjusting the phase of said baseband signals so that each is in phase with the other, comprising:
means for delaying a first of said baseband signals by a predetermined time increment;
means for adding signals related to the remaining of said baseband signals, said added signals comprising a first comparison signal;
means for developing a first correlation signal related to a difference in phase between said first delayed baseband signal and said first comparison signal;
means for delaying each of said remaining baseband signals by a variable time increment;
means for adding said delayed baseband signals so that a plurality of comparison signals are formed, each of which comprises a sum of said delayed baseband signals minus one of said remaining baseband signals;
means for developing a plurality of correlation signals each defining a phase difference between one of said remaining delayed baseband signals and said comparison signals not containing said delayed baseband signals whose phase is being compared;
means for comparing each of said plurality of correlation signals and said first correlation signal, each of said comparisons defining a delay control signal corresponding to one of said remaining delayed baseband signals; and
means for controlling said delay means for each of said remaining delayed baseband signals by its corresponding delay control signal whereby all of said remaining delayed baseband signals will be in phase with said first delayed baseband signal.

11. The adjusting means of claim 10 further comprising means for adding said delayed baseband signals thereby forming a composite baseband signal.

12. The adjusting means of claim 10 wherein said means for developing said correlation signals comprises a plurality of correlators, each having a delayed baseband signal and a comparison signal as inputs, each correlator comprising:
means for providing a first bit train, each bit of which defines the polarity of its input delayed baseband signal at a predetermined time;
means for providing a second bit train, each bit of which defines the polarity of its input comparison signal at a predetermined time; and
means for indexing a counter in relation to the phase relationship between said first and second bit train, the output of said counter comprising said correlation signal.

13. The adjusting means of claim 12 wherein said means for comparing comprises a comparison unit for each of said plurality of correlation signals to be compared to said first correlation signal, each of said comparison units comprising a difference circuit having said first correlation signal as one input and one of said plurality of correlation signals whose phase is to be compared as the other input, said difference circuit providing an output signal related to the difference between its two correlation signal inputs, said output signal comprising said delay control signal.

14. The adjusting means of claim 13 wherein said means for delaying each of said remaining plurality of baseband signals comprises a variable delay circuit for each of said remaining plurality of baseband signals, each variable delay circuit comprising:
 a first in, first out (FIFO) memory system;
 a frequency synthesizer having first and second clock pulse output signals;
 means for controlling said frequency synthesizer first clock pulse output signal by its associated delay control signal;
 means for converting a baseband signal to be delayed into a digital byte at a frequency defined by said first clock pulse signal;
 means for clocking said converted baseband signal into said FIFO memory system at a frequency defined by said first clock pulse signal;
 means for clocking said converted baseband signal out of said FIFO memory system at a frequency defined by said second clock pulse signal, the delay between the time said converted baseband signal is clocked into and out of said FIFO memory system being defined by a relationship between first and second clock pulse output signals.

15. A method for adjusting the phase of a plurality of baseband signals, each of which is provided by an antenna/receiver system, so that said baseband signals will be in phase with each other, the steps comprising:
 delaying a first of said baseband signals by a predetermined time increment;
 delaying each of said remaining baseband signals by a a variable time increment;
 comparing the phase of said first delayed baseband signal and a signal related to the sum of said remaining delayed baseband signals, said comparison defining a first correlation signal;
 comparing the phase of each of said remaining delayed baseband signals and the phase of a sum of all of said delayed baseband signal not containing the delayed baseband signal to be compared, each comparison defining a correlation signal associated with a remaining delayed baseband signal;
 comparing each of said correlation signals associated with one of said remaining delayed baseband signals and said first correlation signal, said comparison defining a delay control signal; and
 varying the delay of each of said remaining baseband signals in accordance with its corresponding delay control signal until all of said delayed baseband signals are in phase with each other.

16. The method of claim 15 further including the step of adding all of said delayed baseband signals, thereby providing a composite baseband signal.

17. The method of claim 16 wherein said step of comparing the phase of each of said remaining delayed baseband signals further comprises the step of including the delayed baseband signal to be compared in said sum whose phase is to be compared.

* * * * *